Sept. 12, 1950      B. W. KEESE      2,521,730
SHIFT MECHANISM

Original Filed March 11, 1944      3 Sheets—Sheet 1

Inventor
Beverly W. Keese
By Strauch & Hoffman
Attorneys

Inventor
Beverly W. Keese
By Strauch & Hoffman
Attorneys

Sept. 12, 1950     B. W. KEESE     2,521,730
SHIFT MECHANISM
Original Filed March 11, 1944     3 Sheets-Sheet 3
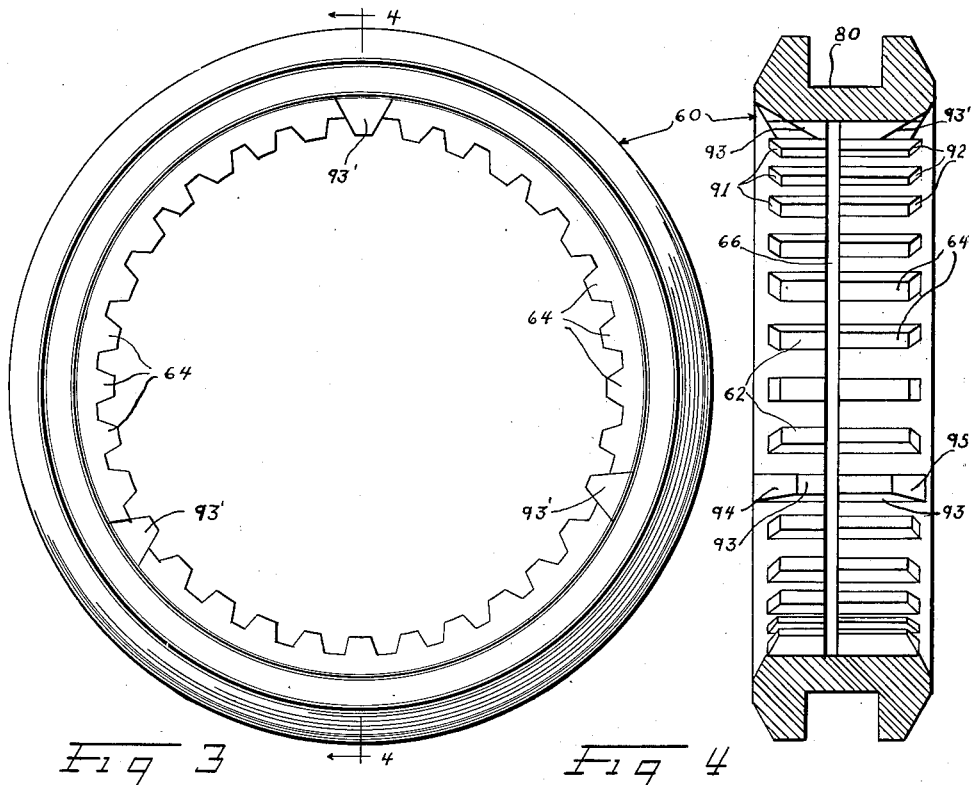
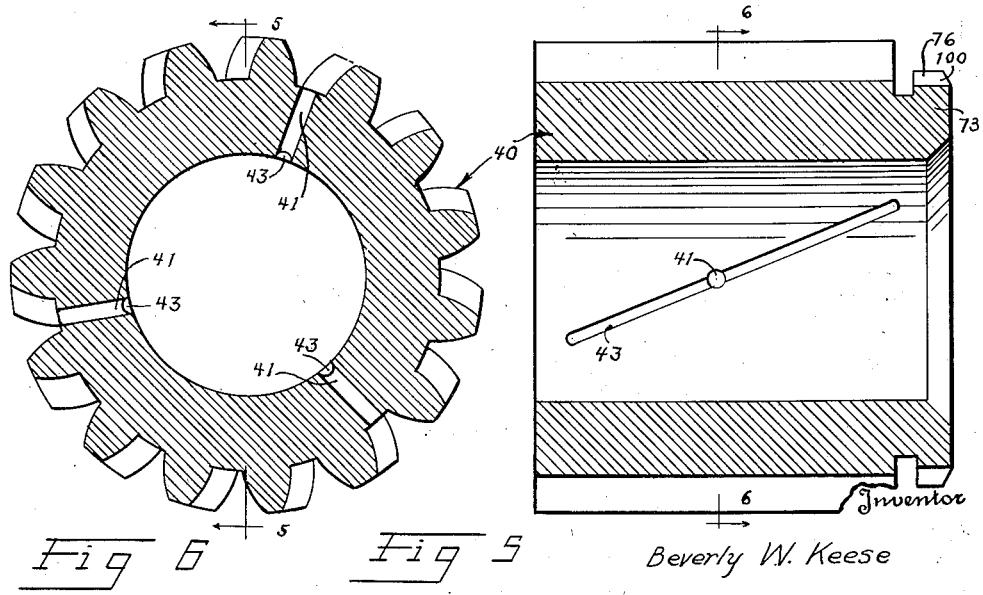
Inventor
Beverly W. Keese
By Strauch & Hoffman
Attorneys Patented Sept. 12, 1950

2,521,730

UNITED STATES PATENT OFFICE 2,521,730

SHIFT MECHANISM

Beverly W. Keese, Oshkosh, Wis., assignor to The Timken-Detroit Axle Company, Detroit, Mich., a corporation of Ohio Original application March 11, 1944, Serial No. 526,044. Divided and this application December 14, 1945, Serial No. 634,904

3 Claims. (Cl. 192—53)

This invention relates to toothed power transmitting mechanism and has particular reference to certain improvements in toothed clutch and like mechanism of the kind disclosed in the copending application of Nelson R. Brownyer Serial No. 544,716, filed July 13, 1944, now Patent No. 2,398,407, issued April 16, 1946, whereby the shifting of a movable toothed member to operatively clutch it to associated and driving or driven elements or to a stationary locking part may be accomplished with ease and facility and clashing or mutilation of the coacting teeth avoided. The subject matter of the present application constitutes a division of my pending application Serial No. 526,044, filed March 11, 1944, now Patent Number 2,460,295, issued February 1, 1949.

It is the principal object of my invention to provide relatively rotatable and toothed members with coacting intermeshable teeth of novel construction whereby, in the relative shifting of the members to engaged position, initial intermeshing of the teeth is prevented until said members are rotating at fully synchronized speeds when the teeth of each member will then easily and smoothly move into the intervening spaces between the teeth on the other member and establish a fully meshed relation without noise or chatter.

In the illustrated embodiment of the invention, I will disclose a clutch wherein a shiftable clutch member having clutch teeth at opposite ends is slidable into engagement with cooperating clutch teeth on either of two adjacent gears, but it will be understood that the invention is applicable to any relatively shiftable and relatively rotatable toothed members, even where one member is stationary.

It is a further object of my invention to provide relatively axially shiftable and rotatable toothed members with confronting smooth end faces lying in parallel substantially conical surfaces of revolution to center the members as they enter toothed engagement and to provide a large area of sliding contact between the end faces prior to toothed engagement. While I have found it very satisfactory, as disclosed in the preferred embodiment, to employ conical surfaces disposed at approximately thirty degrees to the axis of rotation, this exact angle is not critical or essential.

A further object of my invention is to provide a novel arrangement of teeth on a slidable clutch collar and splined shaft assembly providing for locking of the clutch collar against casual axial displacement from one operative position, the clearance necessary for such locking being provided without sacrificing tooth strength.

It is a further general object of my invention to provide power transmission mechanism as above characterized, the several cooperating parts of which are of simple and durable structural form, efficient and reliable in practical operation, and which may be inexpensively fabricated by the use of conventional methods of manufacture.

With the above and other subordinate objects in view, the invention comprises improved power transmission mechanism and the novel construction and operation of the several parts thereof, as will hereinafter be more fully described, illustrated in the accompanying drawings and subsequently incorporated in the subjoined claims.

In the drawings wherein I have illustrated one simple and practical embodiment of the invention and in which similar reference characters designate corresponding parts throughout the several views:

Figure 3 is a side elevation of the shiftable clutch member shown in Figure 2;

Figure 4 is a sectional view taken substantially on the line 4—4 of Figure 3;

Figure 5 is a detail longitudinal sectional view of one of the power transmitting gears taken substantially on the line 5—5 of Figure 6; and Figure 6 is a diametrical sectional view taken substantially on the line 6—6 of Figure 5.

Figure 1:
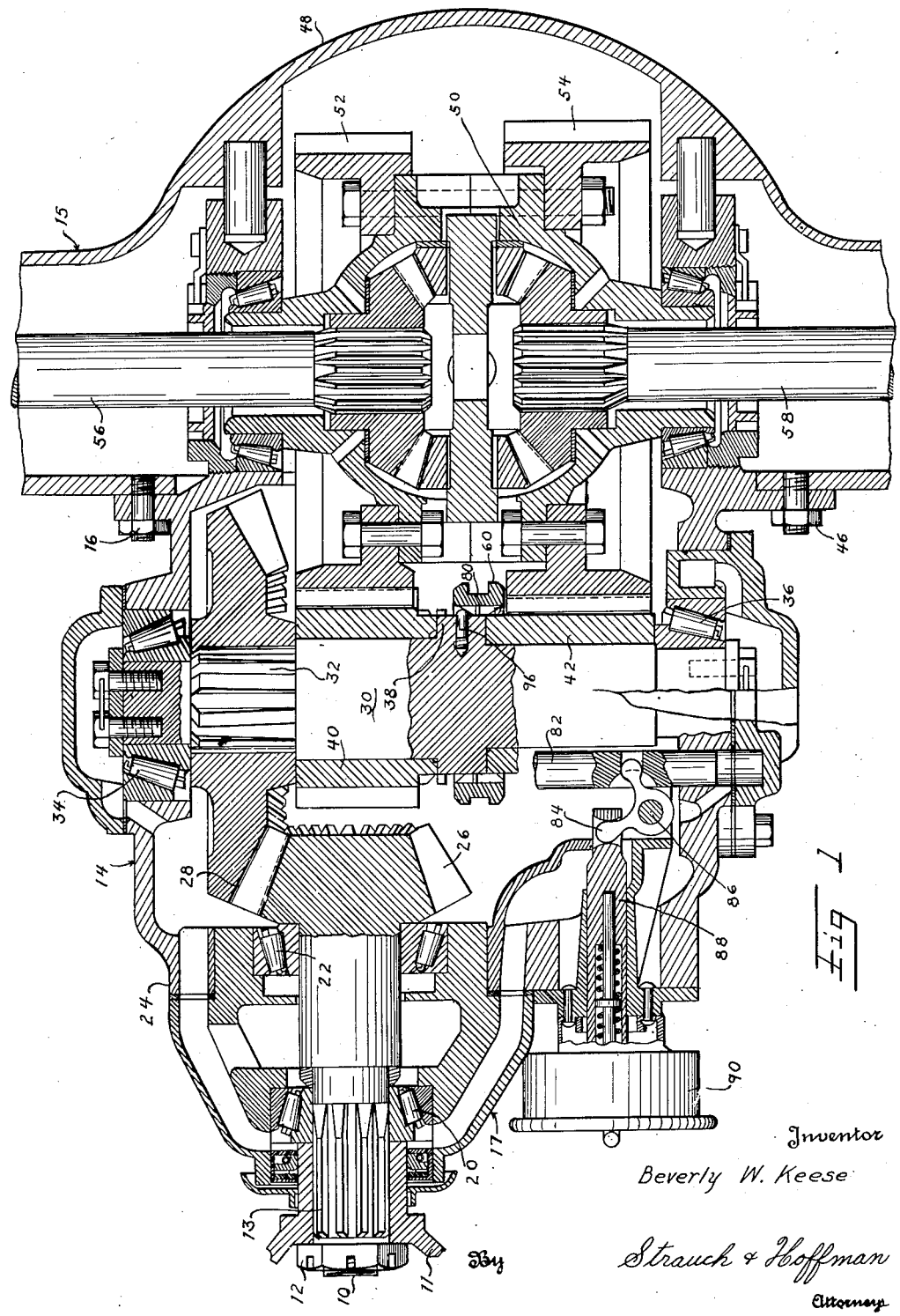
Figure 1 is a horizontal sectional view illustrating a selected practical example of the present invention as applied to a two speed double reduction type of vehicle drive axle.

Referring to Figure 1 of the drawings, which illustrates one practical application of the present invention, the axle driving stub shaft 10 is adapted to be operatively connected with the usual vehicle propeller shaft by means of the universal joint flange 11 secured thereto by a nut 12 and splines 13. Shaft 10 is journaled in the nose of a carrier 14 which is secured to axle housing 15 as by bolts 16.

The stub shaft 10 is rotatably mounted in the front housing part 17 of carrier 14 upon spaced apart anti-friction bearing assemblies 20 and 22 respectively. These bearings are preferably of the tapered roller type, capable of resisting axial loads on the stub shaft as well as lateral or radial forces. The bearing 22 is mounted in a boss or end extension on housing part 17 which is fitted within an opening in the front end wall of the main carrier housing part 24. Housing part 17 is rigidly secured to the housing part 24 by means of suitable bolts (not shown). Within housing part 24, the end of stub shaft 10 is provided with a bevel pinion 26 which is in constant mesh with a bevel ring gear 28 splined as at 32 on one end of a cross shaft 30 disposed at right angles to shaft 10. Shaft 30 at its opposite ends is journaled by anti-friction bearings 34 and 36 respectively, in opposite side walls of the housing part 24.

Intermediate of its ends cross shaft 30 is formed with a diametrically enlarged annular section 38, and at opposite sides thereof power transmission gears 40 and 42 respectively are loosely mounted on said shaft. These gears which are of relatively different diameters are adapted to be selectively connected with the shaft 30 for unitary relation therewith by means of my novel clutch mechanism which will be later described in detail. Preferably, each of the gears 40 and 42 is provided with spaced radial apertures 41 communicating with longitudinally inclined slots 43 in the inner bore of the gear through which lubricant is distributed over the periphery of cross shaft 30. Differential drive axle mechanism is mounted within axle housing 15 adjacent the bowl 48. This mechanism includes the differential gear case or housing 50 to which axially spaced gears 52 and 54 are securely bolted and axle shafts 56 and 58 extend in opposite directions from the differential into connection at their outer ends in the usual manner to the ground engaging wheels. The power transmitting gears 40 and 42 on cross shaft 30 are respectively in constant mesh with the differential drive gears 52 and 54.

Figure 2:
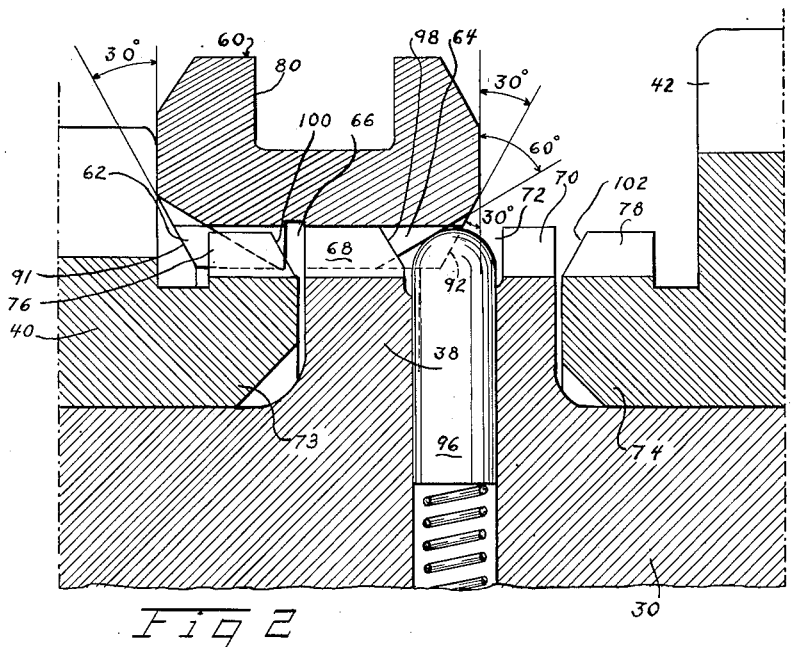
Figure 2 is a fragmentary sectional view of part of Figure 1 on an enlarged scale showing my improved clutch mechanism as employed for the purpose of selectively connecting two different speed transmission gears to a power driven shaft in low speed position.

Referring now to Figures 2, 3 and 4 of the drawings, an annular clutch member 60 is provided with two series of internal clutch teeth 62 and 64 respectively spaced apart by an annular groove 66 formed in the face of said clutch member. The clutch teeth 64 are somewhat longer axially of member 60 than the teeth 62 and also preferably a few thousandths of an inch narrower or thinner than clutch teeth 62. These clutch teeth 62 and 64 coact with the two series of spline teeth 68 and 70 respectively, formed upon the periphery of annular enlargement 38 on cross shaft 30, whereby clutch member 60 is connected with the shaft for unitary rotation therewith and for axial sliding movement relative thereto. The two sets of spline teeth 68 and 70 are separated by an annular groove or channel 72 in the peripheral face of the enlargement 38 of the cross shaft. Each of the transmission gears 40 and 42 is provided on its inner end with a hub extension 73 and 74 respectively, and these hub extensions, in spaced relation to the respective gear teeth are provided on their peripheries with the clutch teeth 76 and 78 respectively. Preferably the outer diameter of these clutch teeth is somewhat less than the diameter of the spline teeth 68 and 70 on the cross shaft.

Clutch member 60 is externally formed with an annular groove 80 in which yoke fingers carried by a shift rod 82 slidably mounted in carrier housing 24 engage to axially shift clutch member 60 and engage its internal teeth selectively with clutch teeth 76 and 78 on the gears 40 and 42, or to a neutral position, in which the teeth of the clutch member are free from engagement with clutch teeth 76 and 78.

Any suitable mechanism may be provided for reciprocating shift rod 82, but for this purpose, I have shown in Figure 1 a bell crank 84 pivotally mounted on a fixed pin 86 and having one of its arms engaged with the shift rod and the other arm thereof engaged with shaft 88 operatively connected with a suitable pneumatic or vacuum actuator generally indicated at 90 mounted on the gear case 24.

Referring again to Figures 2 and 4 of the drawings, it will be noted that a majority of the teeth 62 and 64 of the slidable clutch member 60 have flat outer end faces 91 and 92 respectively inwardly inclined at an angle of approximately thirty degrees with respect to a plane normal to the axis of rotation of said clutch member. Each set of tooth end faces 92 therefore lies in a surface of revolution generated by movement of a line about and at an angle of sixty degrees to the axis of rotation of shaft 30.

A few of the teeth 62 and 64 (in this instance 3 equally spaced sets of teeth 93 and 93' respectively) have flat outer end faces 94 and 95 respectively at an angle of approximately sixty degrees with respect to said plane. These teeth sets 93 and 93' are adapted to coact with a corresponding number of radially movable spring pressed detents 96 (Figure 2) mounted in cross shaft 30 which thereby act against tooth faces 94 or 95 to assist in the final movement of clutch member 60 to engaged position with relation to gears 40 and 42 and to yieldingly resist disengaging movement of said clutch member to a neutral position.

The spline teeth 68 on the shaft 30 are of somewhat greater length than the spline teeth 70 and the inner flat end faces 98 thereof at one side of the channel 72 are disposed in a conical surface of revolution inclined approximately thirty degrees to a plane normal to the axis of revolution of said shaft. Faces 98 are preferably ground and polished smooth. The clutch teeth 76 and 78 on gears 40 and 42 have their smooth flat inner end faces 100 and 102 respectively opposed to the adjacent spline teeth on the shaft in conical surfaces of revolution inclined in reverse directions approximately thirty degrees to planes normal to the axis of revolution of the gear elements. Tooth end faces 91 and 92 are parallel to tooth end faces 100 and 102 respectively, while tooth faces 98 are parallel to tooth faces 91.

In the above described construction, it is to be particularly noted that the side faces of the clutch teeth on slidable clutch member 60 and gears 40 and 42 meet the inclined end smooth flat faces 91, 92, 100 and 102 respectively of said clutch teeth along sharp unchamfered edges so that in the approach of the inclined ends of the clutch teeth on member 60 to the confronting inclined ends of the clutch teeth on the transmission gears a partial intermeshing engagement between the teeth of the clutch member and gear which would tend to twist, distort or mutilate the clutch teeth is impossible and said opposing inclined end faces of the teeth remain in smooth sliding contact with each other until full synchronization in the rotation of the shiftable clutch member and gear is attained.

The general operation of the clutch mechanism is substantially the same as that described in said Brownyer patent and when the clutch member 60 is shifted in either direction from a neutral position to selectively establish a driving connection between shaft 30 and either of the gears 40 or 42, the relatively thick clutch teeth 62 of the member 60 coact with the spline teeth 68 on the shaft 30 to substantially lock the clutch member in its shifted position. The final movement of said clutch member 60 into clutched engagement with the teeth on the gear element is materially assisted by means of the detents 96 which exert an outward pressure against the obliquely inclined faces 94 on certain of the clutch teeth. These detents also, of course, yieldingly resist any casual inward disengaging movement of the clutch member towards its neutral position.

Figure 2A:
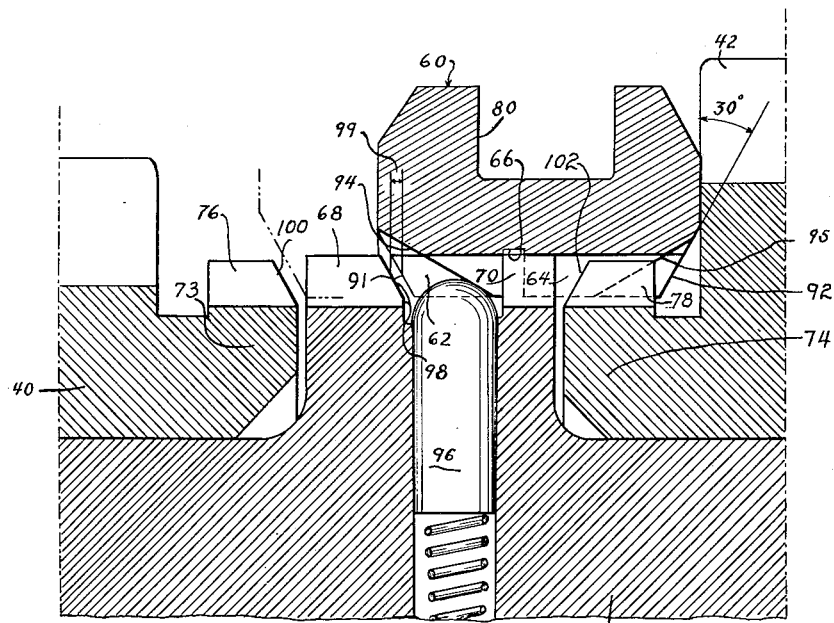
Figure 2A is a section similar to Figure 2 but showing the same parts in high speed position.

When the clutch member 60 has been shifted from the position shown in Figure 2 to the right to engage its teeth 64 with the clutch teeth 78 of the high speed gear 42 as illustrated in Figure 2A, the outer ends of teeth 62 on the clutch member will clear the adjacent inner ends of spline teeth 68 on the shaft 30, in the illustrated embodiment by about 0.051 inch. This clearance 99 is necessary to disengage the thick teeth 62 from driving engagement with the shaft and enable the slight relative rotation of clutch member 60 and shaft 30, permitted by the thin teeth 64 as explained in said Brownyer patent, for effecting axial interference between corners of adjacent tooth faces 91 and 98 and preventing leftward displacement of the clutch member 60. The chamfer at 98 provides the clearance 99 needed for such relative rotation of clutch member 60 at its thin tooth portion, but at the same time retains the full base length of teeth 68 available when the clutch member 60 is engaged therewith to provide maximum tooth strength during torque transmission.

The blocking or locking action between the teeth 62 and 68 will be readily understood by reference to the Brownyer patent. As shown in Figure 2 torque is transmitted through the thick collar teeth 62 to low speed gear 40. Since the clearances between the thin collar teeth 64 and teeth 68 are taken up, in normal driving relationship, the thick teeth 62 are thereby hooked over the ends of teeth 68 so that should the collar tend to shift to the right the corners of teeth 62 will abut the corners of teeth 68 and block such movement so long as power is being transmitted, as shown in Figure 4A of the Brownyer patent. When the collar is shifted to the position of Figure 2A to engage high speed gear 42, the same locking relation of teeth 62 and 68 results, as shown in Figure 6A of said patent.

From the above it will be evident that the cooperating inclined parallel end faces 91 and 98 of clutch teeth 62 and spline teeth 68 of the cross shaft 30 provide a self-centering action in the shifting of the clutch member 60 in either direction from neutral position into meshing relation with either of the gears 40 or 42. This tooth construction also, in addition to affording an easy, smooth and noiseless shifting movement of the clutch collar to its engaged position, provides a maximum area of torque transmitting contact between the side faces of the coacting clutch teeth. Further, this construction provides a base of maximum width at the root of the clutch teeth without sacrificing part of the axial base length of the teeth 68, thereby strengthening the teeth and materially increasing their resistance to stress forces. Furthermore, the inclined face contact between surfaces 91 and 98 provides a larger area of resistance to relative axial displacement than similar surfaces normal to the shaft axis. It will, of course, be understood that there is a certain degree of backlash between the meshing teeth on the clutch collar and the gear elements. Thus in shifting the clutch collar to engaged position, the confronting end faces of the clutch teeth thereon and the clutch teeth on the gear element will be brought into abutting sliding engagement in a common conical surface of revolution generated by a line rotated about the axis of said clutch member and gear element, at an angle of approximately thirty degrees relative thereto in the preferred embodiment. These confronting end faces of the clutch teeth will thus slide relative to each other without burring or clashing as the clutch collar and gear synchronize. Since the clutch teeth have torque transmitting surfaces which join said inclined end faces along sharp edges, any appreciable tendency of the clutch collar and gear element to undergo relative axial movement with respect to said common surface of sliding engagement is substantially precluded until the speeds of rotation have been synchronized. The relationship between the angle of the tooth end faces and the line of thrust of the clutch collar, then insures the instantaneous smooth and continuous sliding movement of the teeth on the clutch collar into fully meshed and centered relation with the teeth on the gear element. In this manner the clutch shifting operation into mesh with the selected gear may be easily and quickly executed at any driving speed with a minimum loss of vehicle headway and without mutilation or injury of the clutch teeth.

Shifting of the clutch collar to low speed position is attended with greater difficulty than when shifting to high speed position, since the vehicle tends to slow down faster than the engine. The present invention facilitates the shift into low speed gear by the successive contact of the inclined end faces 91 of the collar teeth with inclined end faces 98 and 100 respectively of the teeth on the shaft and low speed gear 40, thus providing a double centering action on the loosely mounted clutch collar, whereby the shifting movement of the collar to fully meshed position with the low speed gear may be easily and quickly accomplished.

While I have described the tooth end surfaces as inclined at thirty degrees to the normal to the axis of shaft 30 in the preferred embodiment, it will be understood that the invention is of sufficient scope to cover inclination of those surfaces at substantially that angle for accomplishing the described self-centering and other advantages of the invention.

It will be understood that the novel features of the present invention are not limited to the coupling of two rotating members, as it may also be advantageously employed in power transmissions of the planetary or other types for coupling any two relatively rotatable elements, such as the selective coupling of a rotatable element with a stationary member to produce a speed change. Therefore, in the appended claims, reference to relatively rotatable parts is intended to be inclusive of such other practical applications of the invention and other alternative forms thereof as will be apparent to those familiar with the practical art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In power transmission mechanism, two relatively rotatable members mounted in axially adjacent relation and a torque transmitting element drivingly connected with one of said members by means permitting axial shifting movement of said element relative to the other member; axially extending, coacting clutch teeth on the opposed ends of said other member and elements for intermeshing engagement in the axial movement of said element in one direction relative to the other member, the confronting end faces of the teeth on said element and other member being correspondingly inclined at approximately thirty degrees relative to a plane normal to the axis of rotation of said torque transmitting element and having abutting sliding engagement in a common conical surface of revolution generated by a line rotated about said axis in obliquely intersecting relation thereto and coacting to axially center said element with respect to said other member, said end faces joining the opposite side faces of the clutch teeth on the respective element and member along sharp unchamfered edges, whereby any appreciable tendency of said element to move axially relative to said conical surface of revolution into intermeshed relation with the other member is prevented until the clutch teeth on said element are in accurate axially aligned registration with the spaces between the clutch teeth on the other member.

2. In power transmission mechanism, a driving shaft, axially spaced high and low speed gears rotatably mounted on said shaft and provided on their opposed ends with external clutch teeth, two axially spaced series of teeth on said shaft between the clutch teeth on said gears, an axially shiftable torque transmitting clutch collar loosely circumscribing said shaft and having internal clutch teeth slidably coacting with teeth on said shaft, said clutch teeth on the collar and respective gears having opposing obliquely inclined parallel end faces for abutting sliding engagement in common conical surfaces of revolution, oppositely inclined with respect to the shaft axis when the collar is axially shifted to clutch the respective gears to said shaft and preventing further axial movement thereof until the clutch teeth on said collar are in axially aligned registration with the spaces between the clutch teeth on the gear, one of said series of teeth on the driving shaft adjacent to the clutch teeth on the low speed gear also having obliquely inclined end faces opposed to the collar and lying in a conical surface of revolution substantially parallel to the coacting end faces of the clutch teeth on said low speed gear and collar, whereby said inclined tooth end faces of the collar successively coact with the inclined end faces of the teeth on said shaft and gear to coaxially center said collar with respect to said gear in the shifting movement of the collar to low speed torque transmitting position, the confronting end faces of the teeth on said collar, gears and shaft being inclined at substantially thirty degrees with respect to a plane normal to the axis of said driving shaft.

3. In a power transmission mechanism, a shaft having intermediate its ends two sets of external teeth separated by an annular groove, the inner ends of said tooth sets providing the opposite radial walls of said groove, a clutch collar having two sets of axially spaced internal teeth of different chordal thickness axially slidable on said shaft at said intermediate portion between low and high speed positions, the end surfaces of the teeth at opposite sides of said collar lying in oppositely disposed conical surfaces of revolution about the axis of said shaft, and the inner wall of said shaft groove adjacent the thicker teeth lying in a conical surface of revolution parallel to the tooth end faces at the adjacent side of said clutch collar, said surfaces of revolution being inclined at approximately thirty degrees with respect to the axis of said shaft, whereby when said clutch collar is disposed in said high speed position said thick teeth are cleared from engagement with the set of teeth on said shaft remote from said high speed position to enable relative rotation between said clutch collar and shaft at said thin teeth to lock said clutch collar against casual axial displacement from said high speed position, and said inclined wall formation of the groove providing thick teeth of maximum base length for increased strength in transmitting torque when the clutch collar is in low speed position while at the same time retaining full axial length of said thick teeth.

BEVERLY W. KEESE.

REFERENCES CITED

The following references are of record in the file of this patent:

UNITED STATES PATENTS

| Number | Name | Date |
|---|---|---|
| 2,364,331 | White | Dec. 5, 1944 |
| 2,398,407 | Brownyer | Apr. 16, 1946 |
| 2,399,569 | Peterson et al. | Apr. 30, 1946 |

Certificate of Correction

Patent No. 2,521,730 — September 12, 1950

BEVERLY W. KEESE

It is hereby certified that error appears in the printed specification of the above numbered patent requiring correction as follows:

Column 3, line 26, for the word "relation" read *rotation*; column 4, line 2, for "and", first occurrence, read *or*; column 7, line 18, for "elements" read *element*; line 49, before "teeth" insert *the*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*